(12) United States Patent
Hoang et al.

(10) Patent No.: US 11,416,469 B2
(45) Date of Patent: Aug. 16, 2022

(54) UNSUPERVISED FEATURE LEARNING FOR RELATIONAL DATA

(71) Applicant: International Business Machines Corporation, Armonk, NY (US)

(72) Inventors: Thanh Lam Hoang, Maynooth (IE); Long Vu, Chappaqua, NY (US); Theodoros Salonidis, Wayne, PA (US); Gregory Bramble, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/102,707

(22) Filed: Nov. 24, 2020

(65) Prior Publication Data

US 2022/0164332 A1 May 26, 2022

(51) Int. Cl.
*G06F 16/22* (2019.01)
*G06F 16/2455* (2019.01)
(Continued)

(52) U.S. Cl.
CPC ........ *G06F 16/2282* (2019.01); *G06F 16/244* (2019.01); *G06F 16/2456* (2019.01); *G06N 3/0454* (2013.01); *G06F 16/284* (2019.01)

(58) Field of Classification Search
CPC ............... G06F 16/2282; G06F 16/244; G06F 16/2456; G06F 16/284
See application file for complete search history.

(56) References Cited

U.S. PATENT DOCUMENTS 9,087,236 B2  7/2015  Dhoolia
10,762,111 B2  9/2020  Buesser
(Continued)

FOREIGN PATENT DOCUMENTS

CN  105243385 B  11/2018
CN  109886345 A  6/2019
(Continued)

OTHER PUBLICATIONS

Doersch, Carl, "Tutorial on Variational Autoencoders", arXiv:1606.05908v2 [stat.ML], Aug. 13, 2016, 23 Pages.
(Continued)

*Primary Examiner* — Dangelino N Gortayo
(74) *Attorney, Agent, or Firm* — Stephanie L. Carusillo

(57) ABSTRACT

In an approach to unsupervised feature learning for relational data, a computer trains one or more entity aware autoencoders on one or more tables in a relational database, where each of the one or more entity aware autoencoders corresponds to one of the one or more tables in the relational database, and where each of the one or more entity aware autoencoders are comprised of an encoder and a decoder. A computer transforms each of the one or more tables in the relational database with the encoder of the corresponding trained entity aware autoencoder. A computer joins a first transformed table of the one or more tables in the relational database with each remaining one or more transformed tables in the relational database to form one or more joined tables. A computer aggregates the one or more joined tables. A computer outputs one or more feature representations.

20 Claims, 7 Drawing Sheets

(51) Int. Cl.
*G06N 3/04* (2006.01)
*G06F 16/242* (2019.01)
*G06F 16/28* (2019.01)

(56) References Cited

U.S. PATENT DOCUMENTS

| | | | |
|---|---|---|---|
| 2017/0024435 A1* | 1/2017 | Kociubes | G06F 16/2453 |
| 2017/0060652 A1 | 3/2017 | Biem | |
| 2018/0165554 A1* | 6/2018 | Zhang | G06K 9/6256 |
| 2019/0155930 A1* | 5/2019 | Fender | G06F 16/2282 |
| 2019/0391978 A1* | 12/2019 | Liu | G06F 16/2282 |
| 2020/0042544 A1 | 2/2020 | Chen | |
| 2021/0081410 A1* | 3/2021 | Chavan | G06F 9/3887 |
| 2021/0133590 A1* | 5/2021 | Amroabadi | G06N 3/0454 |
| 2021/0141801 A1* | 5/2021 | Teague | G06F 40/253 |
| 2021/0406283 A1* | 12/2021 | Chatbri | G06F 16/284 |

FOREIGN PATENT DOCUMENTS

| | | |
|---|---|---|
| CN | 110580517 A | 12/2019 |
| CN | 110717526 A | 1/2020 |
| CN | 110866030 A | 3/2020 |

OTHER PUBLICATIONS

Kanter et al., "Deep Feature Synthesis:Towards Automating Data Science Endeavors", IEEE International Conference on Data Science and Advanced Analytics (DSAA), Paris, 2015, 10 Pages.

Khurana et al., "Cognito: Automated Feature Engineering for Supervised Learning", IEEE 16th International Conference on Data Mining Workshops, 2016, 4 Pages.

Lam et al., "One button machine for automating feature engineering in relational databases", arXiv:1706.00327v1 [cs. DB], Jun. 1, 2017, 9 Pages.

Meng et al., "Relational Autoencoder for Feature Extraction", arXiv: 1802.03145v1 [cs.LG], Feb. 9, 2018, 8 Pages.

Nargesian et al., "Learning Feature Engineering for Classification", Proceedings of the Twenty-Sixth International Joint Conference on Artificial Intelligence (IJCAI-17), 2017, 7 Pages.

Vincent et al., "Stacked Denoising Autoencoders: Learning Useful Representations in a Deep Network with a Local Denoising Criterion", Journal of Machine Learning Research 11 (2010) 3371-3408, Dec. 2010, 38 Pages.

* cited by examiner

UNSUPERVISED FEATURE LEARNING FOR RELATIONAL DATA

BACKGROUND OF THE INVENTION

The present invention relates generally to the field of data analysis, and more particularly to unsupervised feature learning for relational data.

A relational database is a digital database based on a relational model of data. The relational model organizes data into one or more tables (or "relations") of columns and rows, with a unique key identifying each row. Rows are also called records or tuples. Columns are also called attributes. Generally, each table/relation represents one "entity type" (such as customer or product). The rows represent instances of that type of entity (such as "Smith" or "chair") and the columns represent values attributed to that instance (such as address or price). Between tables, there may be one or more connections via foreign key relations, for example, a flight table can have a relationship to an airport table via a flight identifier column.

Unsupervised learning is a type of machine learning that looks for previously undetected patterns in a data set with no pre-existing labels and with a minimum of human supervision. In contrast to supervised learning, that makes use of human-labelled data, unsupervised learning, also known as self-organization, allows for modeling of probability densities over inputs. Unsupervised learning forms one of the three main categories of machine learning, along with supervised and reinforcement learning. Cluster analysis is used in unsupervised learning to group, or segment, datasets with shared attributes in order to extrapolate algorithmic relationships. Cluster analysis is a branch of machine learning that groups the data that has not been labelled, classified, or categorized. Instead of responding to feedback, cluster analysis identifies commonalities in the data and reacts based on the presence or absence of such commonalities in each new piece of data. This approach helps detect anomalous data points that do not fit into either group.

An autoencoder is a type of artificial neural network used to learn efficient data codings in an unsupervised manner. The aim of an autoencoder is to learn a representation (encoding) for a set of data, typically for dimensionality reduction, by training the network to ignore signal "noise". Along with the reduction side, a reconstructing side is learned, where the autoencoder tries to generate, from the reduced encoding, a representation as close as possible to its original input. Popular autoencoders for tabular data include a denoising autoencoder, which adds random noises to an input row, and a variational autoencoder, which can predict mean and variance in a latent space.

SUMMARY

Embodiments of the present invention disclose a computer-implemented method, a computer program product, and a system for unsupervised feature learning for relational data. The computer-implemented method may include one or more computer processors training one or more entity aware autoencoders on one or more tables in a relational database, where each of the one or more entity aware autoencoders corresponds to one of the one or more tables in the relational database, and where each of the one or more entity aware autoencoders are comprised of an encoder and a decoder. One or more computer processors transform each of the one or more tables in the relational database with the encoder of the corresponding trained entity aware autoencoder. One or more computer processors join a first transformed table of the one or more tables in the relational database with each remaining one or more transformed tables in the relational database to form one or more joined tables. One or more computer processors aggregate the one or more joined tables. One or more computer processors output one or more feature representations.

DETAILED DESCRIPTION

Learning effective numerical vector representation of data is an important problem that has wide applications in data clustering, anomaly detection, classification, and regression analyses. Current methods tend to focus on learning representation for unstructured data, such as text and images, or structured data kept in a single table. In practice, structured, relational data comprised of multiple data tables is frequently presented. There is a need for learning representation for complex, structured data, specifically for relational data with multiple tables.

Autoencoders include two components: an encoder, and a decoder. The encoder encodes an input row of a table into a vector representation, sometimes referred to as an embedded vector. The decoder tries to reconstruct the original row of the table from the embedded vector. Neural networks with learnable parameters can be used as encoders and decoders. The neural networks are trained to minimize the reconstruction errors; therefore, the embedded vector is a compression of the input row of a table. State of the art autoencoders for tabular data do not consider relationships between rows in a table, including any temporal relationship.

Embodiments of the present invention recognize that learned representation of structured data can be improved by implementing a method that learns the representation in an unsupervised manner such that the method can be easily applied in practice where labelled data may be scarce. Embodiments of the present invention also recognize that the method can provide a learned representation that can be used for unsupervised tasks, such as data clustering or anomaly detection, as well as supervised tasks, such as regression or classification. Embodiments of the present invention further recognize that data analysis improvements may be made by implementing an entity aware autoencoder for a table that uses groups of rows corresponding to an entity to predict rows in the group. Implementation of embodiments of the invention may take a variety of forms, and exemplary implementation details are discussed subsequently with reference to the Figures.

Figure 1:
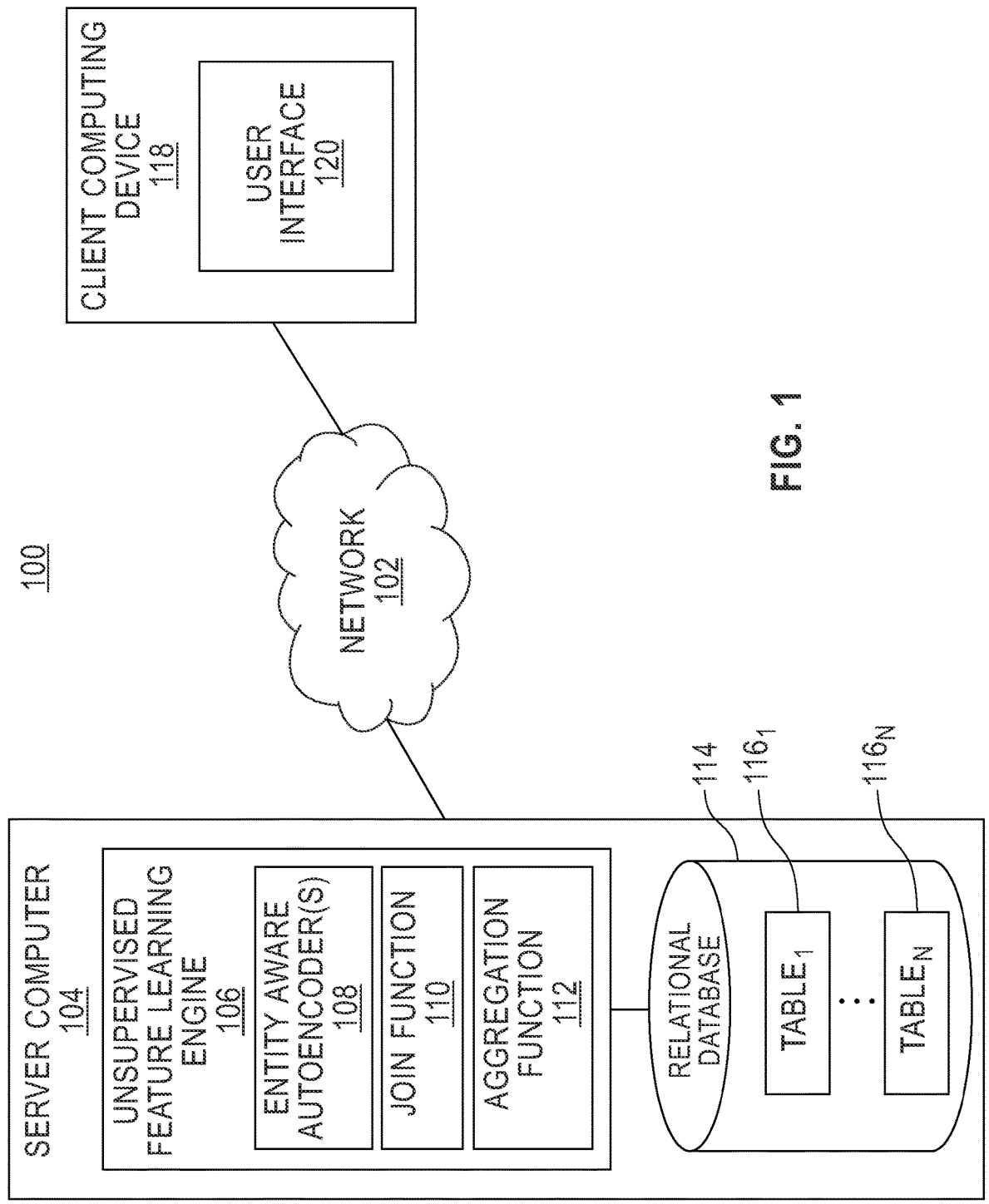
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 118, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 118 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes unsupervised feature learning engine 106 and relational database 114. Server computer 104 may include internal and external hardware components, as depicted and described in further detail with respect to FIG. 4.

Unsupervised feature learning engine 106 takes the inputs of a relational database with multiple tables, where one table is specified as the main table, as well as foreign key relationships between the tables, timestamp columns in the tables (if available), and a specified maximum depth for traversing a relational graph, and uses an entity aware autoencoder to transform rows in each table of a relational database into compacted numerical vector representation. Unsupervised feature learning engine 106 trains entity aware autoencoder(s) 108 on associated tables in relational database 114. Unsupervised feature learning engine 106 transforms each table with an associated, trained encoder. Unsupervised feature learning engine 106 joins a transformed main table to one or more other transformed tables following different joining paths using join function 110. Unsupervised feature learning engine 106 aggregates the result for each joined table using aggregation function 112. Unsupervised feature learning engine 106 outputs the results. Unsupervised feature learning engine 106 is depicted and described in further detail with respect to FIG. 2, FIG. 3B, FIG. 3C, and FIG. 3D.

Entity aware autoencoder(s) 108 are one or more unique autoencoders that consider relationships between rows in a database table, including temporal relationships, if they exist. There is a unique entity aware autoencoder of entity aware autoencoder(s) 108 that corresponds to each database table. Entity aware autoencoder(s) 108 uses groups of rows corresponding to an entity to predict rows in that group. In a relational database, each table has a set of foreign keys. Each foreign key corresponds to a type of entity. For example, the column pair of (shop_id, item_id) defines an entity corresponding to an item being sold in a specific shop. Because of the availability of this type of information in a relational database, unsupervised feature learning engine 106 uses entity aware autoencoder(s) 108 to learn representation for each row in a table that considers relationships between rows with an entity in the data. In particular, rows are grouped according to the value of the entity keys. In an embodiment where the data has an order defined by a timestamp column, entity aware autoencoder(s) 108 are structured as a recurrent neural network. In an embodiment where the data does not include a timestamp column, entity aware autoencoder(s) 108 are structured as an attention neural network, which is trained by predicting each row in a group using all the other rows in that group.

Join function 110 is one or more of a plurality of functions known in the art that unsupervised feature learning engine 106 uses to join two data tables. Unsupervised feature learning engine 106 uses different joining paths between a main table and other tables in a relational database, such as relational database 114, and limits the joining path length to a specified maximum depth. In an embodiment, join function 110 includes a groupby function to group rows in a joined table by an entity column, such as a primary key of a table designated as a main table.

Aggregation function 112 is one or more of a plurality of functions known in the art that unsupervised feature learning engine 106 uses to aggregate joined tables. For example, if the joined table has a timestamp column, then aggregation function 112 can be a most-recent function. In another example, if the joined table does not have a timestamp column, then the aggregation function 112 can be a mean function.

Relational database 114 is a repository for data used by unsupervised feature learning engine 106. In the depicted embodiment, relational database 114 resides on server computer 104. In another embodiment, relational database 114 may reside elsewhere within distributed data processing environment 100, provided unsupervised feature learning engine 106 has access to relational database 114. A database is an organized collection of data. Relational database 114 can be implemented with any type of storage device capable of storing data and configuration files that can be accessed and utilized by unsupervised feature learning engine 106, such as a database server, a hard disk drive, or a flash memory. Relational database 114 includes table $116_1$ to table $116_N$. As used herein, N represents a positive integer, and accordingly the number of scenarios implemented in a given embodiment of the present invention is not limited to those depicted in FIG. 1. Table $116_1$ to table $116_N$ store relational data for any of a plurality of database applications, where the data can be used for unsupervised tasks, such as data clustering or anomaly detection. As would be recognized by a person of skill in the art, between any two tables of relational database 114, there can be one or more connections via foreign key relations. A relation can be many-one, one-one, or one-many. An example of a relational database is depicted and discussed in further detail with respect to FIG. 3A.

The present invention may contain various accessible data sources, such as relational database 114, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Unsupervised feature learning engine 106 enables the authorized and secure processing of personal data. Unsupervised feature learning engine 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Unsupervised feature learning engine 106 provides information regarding personal data and the nature (e.g., type, scope, purpose, duration, etc.) of the processing. Unsupervised feature learning engine 106 provides the user with copies of stored personal data. Unsupervised feature learning engine 106 allows the correction or completion of incorrect or incomplete personal data. Unsupervised feature learning engine 106 allows the immediate deletion of personal data.

Client computing device 118 can be one or more of a laptop computer, a tablet computer, a smart phone, a smart watch, a smart speaker, or any programmable electronic device capable of communicating with various components and devices within distributed data processing environment 100, via network 102. Client computing device 118 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 118 may be integrated into a vehicle of the user. For example, client computing device 118 may include a heads-up display in the windshield of the vehicle. In general, client computing device 118 each represents one or more programmable electronic devices or combination of programmable electronic devices capable of executing machine readable program instructions and communicating with other computing devices (not shown) within distributed data processing environment 100 via a network, such as network 102. Client computing device 118 includes an instance of user interface 120.

User interface 120 provides an interface between unsupervised feature learning engine 106 on server computer 104 and a user of client computing device 118. In one embodiment, user interface 120 is mobile application software. Mobile application software, or an "app," is a computer program designed to run on smart phones, tablet computers and other mobile devices. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 120 enables a user of client computing device 118 to interact with unsupervised feature learning engine 106. For example, user interface 120 enables a user of client computing device 118 to request a data transformation from unsupervised feature learning engine 106. In another example, user interface 120 enables a user of client computing device 118 to provide inputs to unsupervised feature learning engine 106. For example, a user can specify the maximum depth for unsupervised feature learning engine 106 to traverse on a relational graph. In another example, a user can specify which table of the database is the main table. In a further example, a user can specify a type of aggregation function for aggregation function 112.

Figure 2:
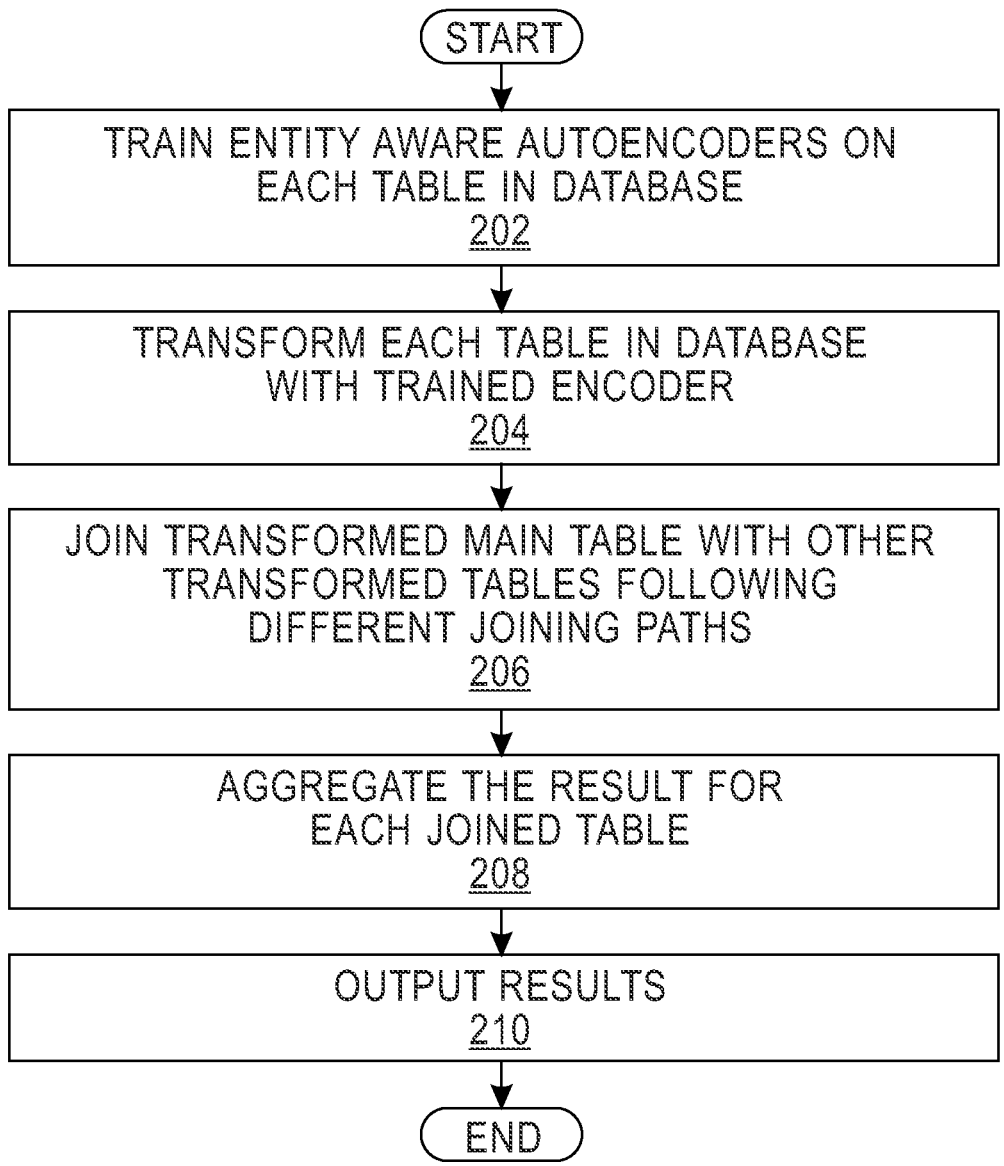
FIG. 2 is a flowchart depicting operational steps of an unsupervised feature learning engine, on a server computer within the distributed data processing environment of FIG. 1, for unsupervised feature learning for relational data, in accordance with an embodiment of the present invention.

FIG. 2 is a flowchart depicting operational steps of unsupervised feature learning engine 106, on server computer 104 within distributed data processing environment 100 of FIG. 1, for unsupervised feature learning for relational data, in accordance with an embodiment of the present invention.

Unsupervised feature learning engine 106 trains entity aware autoencoder(s) 108 on each table in relational database 114 (step 202). In an embodiment, unsupervised feature learning engine 106 receives a designation of table $116_1$ as the main table of relational database 114 from a user of client computing device 118, via user interface 120. In an embodiment, unsupervised feature learning engine 106 trains an entity aware autoencoder of entity aware autoencoder(s) 108 for each of table $116_1$ to $116_N$ on each set of foreign keys that connect to each of the tables. The training results in a restructured table for each of table $116_1$ to $116_N$. In an embodiment, the goal of the training is to minimize the difference between the original table and the reconstructed table. The objective function of the training is, for example, minimize L(table $116_1$, reconstructed table $116_1$), where L is the loss function which measures a difference between the two tables. In an embodiment, unsupervised feature learning engine 106 stores the reconstructed data tables in relational database 114. An example of the training of entity aware autoencoder(s) 108 is discussed in further detail with respect to FIG. 3B.

Unsupervised feature learning engine 106 transforms each table in relational database 114 with a trained encoder (step 204). In an embodiment, once the encoder and decoder components of each of entity aware autoencoder(s) 108 are trained, unsupervised feature learning engine 106 transforms each of table $116_1$ to $116_N$ using the encoder component of the associated entity aware autoencoder. The transformation is the creation of an embedded vector, i.e., a useful feature, that represents an input row of a table. The embedded vector is a compression of the input row of the table. In an embodiment, unsupervised feature learning engine 106 stores the transformed data tables in relational database 114. An example of the transformation of the data tables is discussed in further detail with respect to FIG. 3C.

Unsupervised feature learning engine 106 joins the transformed main table with each of the other transformed tables following different joining paths (step 206). In an embodiment, unsupervised feature learning engine 106 joins the transformed main table with the other transformed tables in relational database 114 using join function 110. In an embodiment, unsupervised feature learning engine 106 joins the transformed main table with the other transformed tables in relational database 114 at the respective columns that are related to each other, forming a joined column of data where the tables are connected. In an embodiment, a user of client computing device 118 specifies the maximum depth for the joining operation via user interface 120. The maximum depth can be considered the number of steps between the transformed main table and another table. The maximum depth is a positive integer. For example, if the maximum depth equals one, then unsupervised feature learning engine 106 joins the transformed main table with each additional transformed table via a direct joining path. In another example, if the maximum depth is two, then unsupervised feature learning engine 106 joins the transformed main table with each additional transformed table via a direct joining path, and, in addition, joins the transformed main table via an indirect path, i.e., via another transformed table. An example of the joining of the data tables is discussed in further detail with respect to FIG. 3D.

In an embodiment, in addition to the joining operation, unsupervised feature learning engine 106 performs a groupby operation on the joined tables. As would be recognized by a person of skill in the art, the groupby operation groups rows in each joined table by a primary column, as a means to sort the data in each joined table. In an embodiment, if the joined table includes a timestamp column, then the groupby operation orders the rows in each group by the timestamp.

Unsupervised feature learning engine 106 aggregates the result for each joined table (step 208). In an embodiment, unsupervised feature learning engine 106 aggregates the results of each of the joined tables using aggregation function 112. In an embodiment where the joined table includes a timestamp column, unsupervised feature learning engine 106 uses an aggregation function such as a most-recent function, which takes into account the timestamp order of the joined table. In an embodiment where the joined table does not include a timestamp column, unsupervised feature learning engine 106 uses an aggregation function that does not require a temporal order, such as a mean function. In an embodiment, a user of client computing device 118 specifies, via user interface 120, which type of aggregation function to use.

Unsupervised feature learning engine 106 outputs results (step 210). In an embodiment, unsupervised feature learning engine 106 extracts data feature representations for the main table, i.e., table $116_1$, from the joined and aggregated data tables and outputs the results of the join and aggregation operations. In an embodiment, unsupervised feature learning engine 106 stores the results in relational database 114. Since unsupervised feature learning engine 106 extracts new feature representations in an unsupervised manner, the results can be used to solve problems, for example, data clustering or anomaly detection, for data in a relational format where there is no labelled data.

Figure 3A:
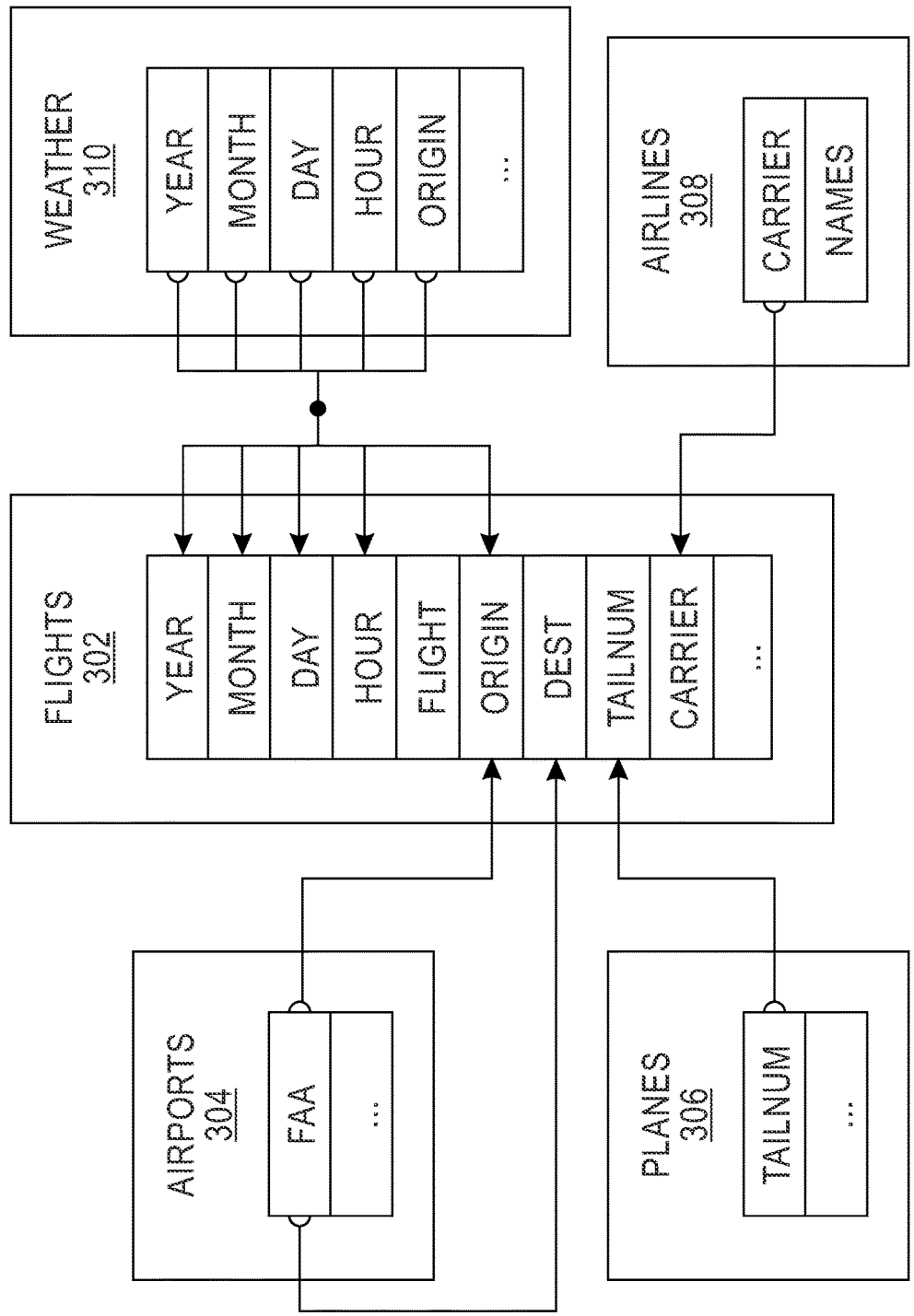
FIG. 3A illustrates an example of relational data, on a relational database on the server computer within the distributed data processing environment of FIG. 1, in accordance with an embodiment of the present invention.

FIG. 3A illustrates example 300 of relational data, representative of relational database 114 on server computer 104 within distributed data processing environment 100 of FIG. 1, in accordance with an embodiment of the present invention. Example 300 is an example of flight data, which may be used to determine flight delays. As there are many factors that can influence a flight delay, there is a need to collect data across multiple tables. Example 300 includes flights table 302, which is designated at the main table, as discussed with respect to table $116_1$ of FIG. 1. Example 300 also includes airports table 304, planes table 306, airlines table 308, and weather table 310. The arrows between the tables represent connections, or relationships, between the tables, which may also be described as foreign keys.

Figure 3B:
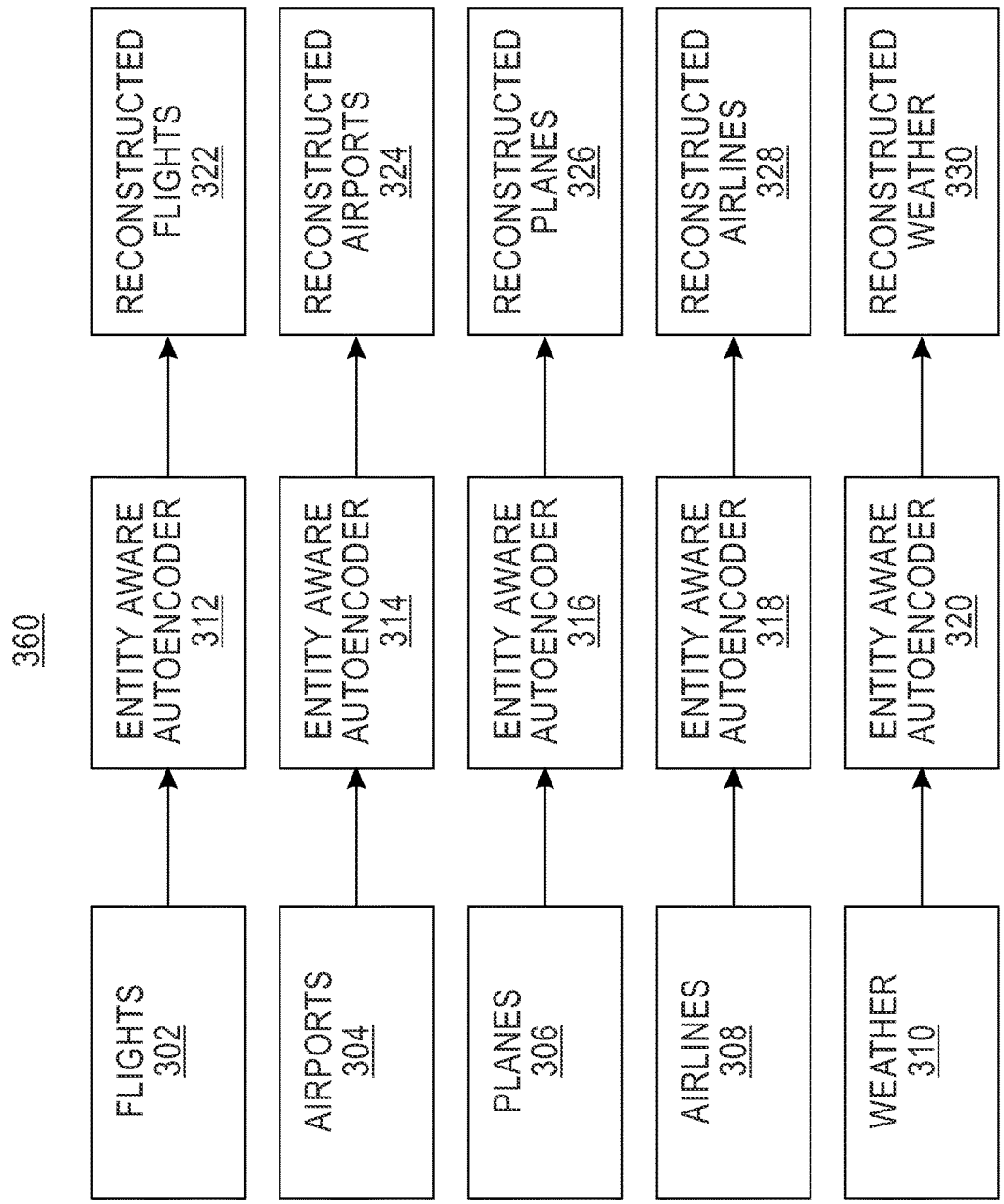
FIG. 3B illustrates an example of an action of an autoencoder included in the unsupervised feature learning engine, on the server computer within the distributed data processing environment of FIG. 1, in accordance with an embodiment of the present invention.

FIG. 3B illustrates example 360 of an action of entity aware autoencoders, representative of entity aware autoencoder(s) 108 included in unsupervised feature learning engine 106, on server computer 104 within distributed data processing environment 100 of FIG. 1, in accordance with an embodiment of the present invention. Example 360 includes the same relational tables shown in example 300, i.e., flights table 302, airports table 304, planes table 306, airlines table 308, and weather table 310. As indicated by the flow diagrams, unsupervised feature learning engine 106 processes each table through a corresponding entity aware autoencoder in order to train the entity aware autoencoder, i.e., entity aware autoencoders 312, 314, 316, 318, and 320. For example, unsupervised feature learning engine 106 feeds flight table 302 into entity aware autoencoder 312. In another example, unsupervised feature learning engine 106 feeds airports table 304 into entity aware autoencoder 314. The output of the training is a set of corresponding reconstructed tables, i.e., reconstructed flights table 322, reconstructed airports table 324, reconstructed planes table 326, reconstructed airlines table 328, and reconstructed weather table 330. For example, entity aware autoencoder 312 outputs reconstructed flights table 322. As discussed with respect to step 202 of FIG. 2, the goal of the training is to minimize the difference between the original table and the reconstructed table.

Figure 3C:
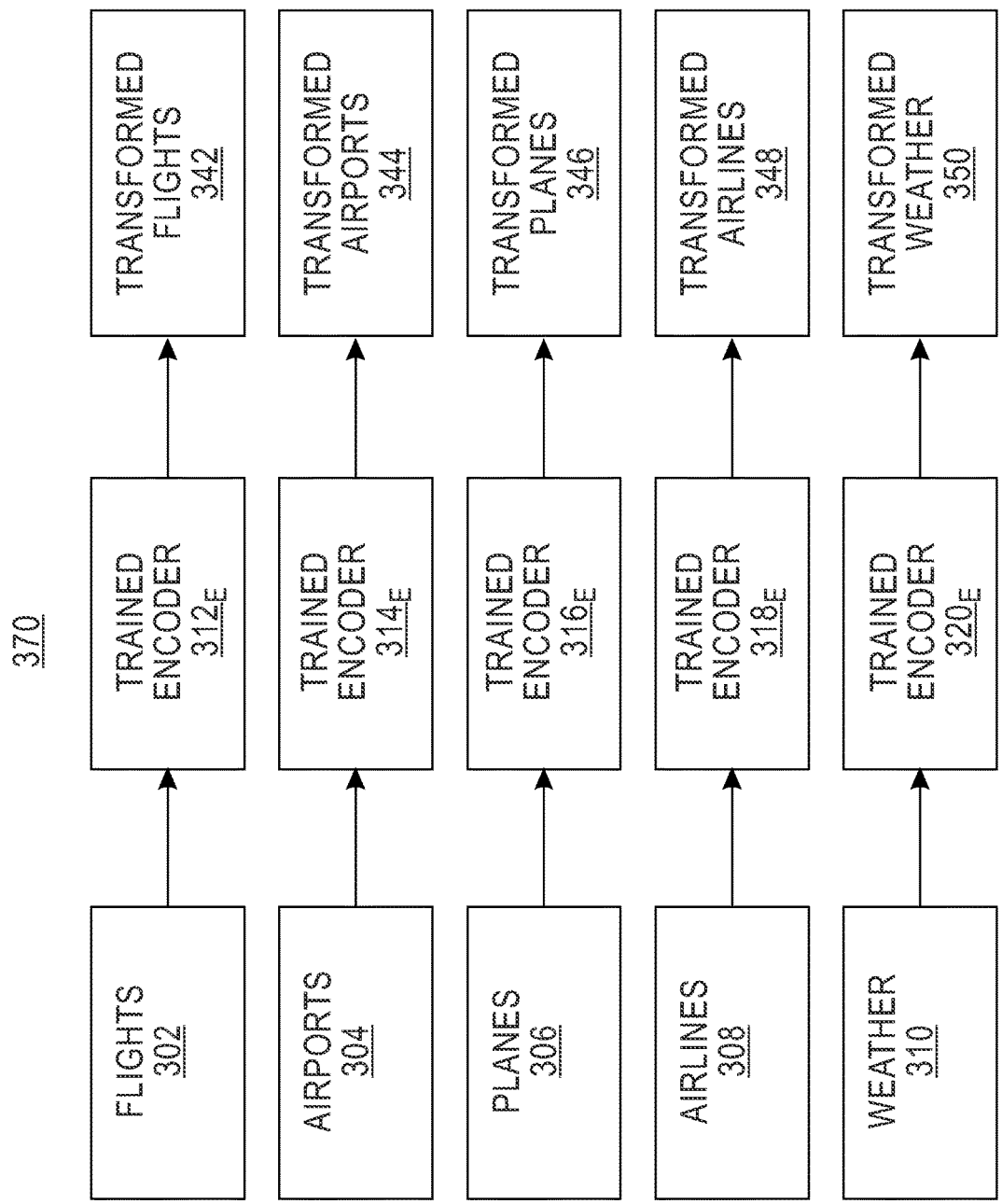
FIG. 3C illustrates an example of a data transformation performed by the unsupervised feature learning engine, on the server computer within the distributed data processing environment of FIG. 1, in accordance with an embodiment of the present invention.

FIG. 3C illustrates example 370 of a data transformation performed by unsupervised feature learning engine 106, on server computer 104 within distributed data processing environment 100 of FIG. 1, in accordance with an embodiment of the present invention. Example 370 includes the same relational tables shown in example 300, i.e., flights table 302, airports table 304, planes table 306, airlines table 308, and weather table 310. Once trained, each entity aware autoencoder includes a trained encoder and a trained decoder. Example 370 includes the trained encoders corresponding to the entity aware autoencoders of FIG. 3B. The flow diagrams indicate the relational data tables feeding into the corresponding trained encoders, i.e., trained encoders $312_E$, $314_E$, $316_E$, $318_E$, and $320_E$. For example, unsupervised feature learning engine 106 processes flights table 302 through trained encoder $312_E$ which corresponds to entity aware autoencoder 312. The trained encoders transform each of the corresponding data tables, i.e., transformed flights table 342, transformed airports table 344, transformed planes table 346, transformed airlines table 348, and transformed weather table 350, as indicated by the flow diagrams. For example, trained encoder $312_E$ transforms flights table 302 into transformed flights table 342.

Figure 3D:
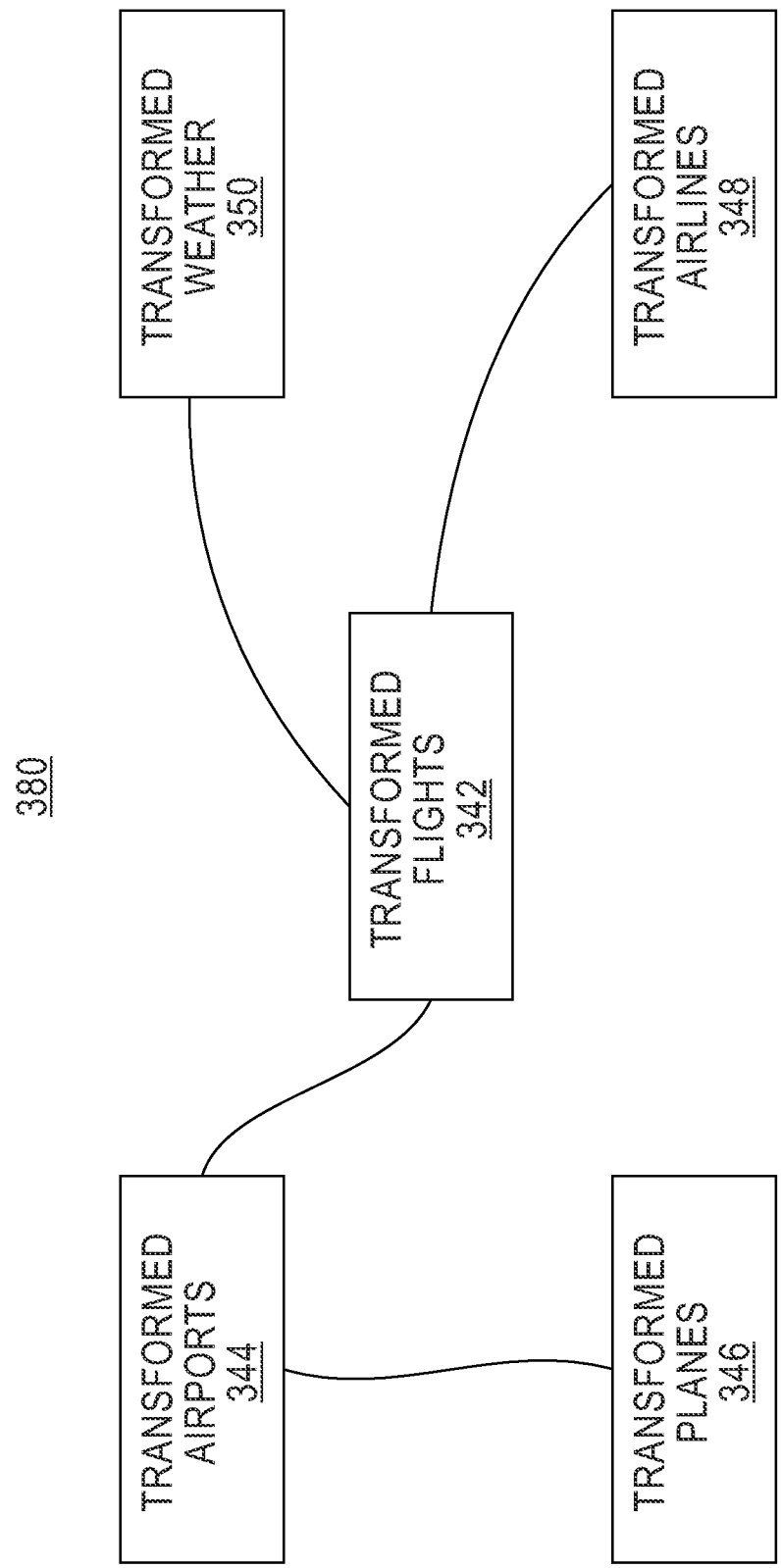
FIG. 3D illustrates an example of a joining operation performed by the unsupervised feature learning engine, on the server computer within the distributed data processing environment of FIG. 1, in accordance with an embodiment of the present invention.

FIG. 3D illustrates example 380 of a joining operation performed by join function 110 of unsupervised feature learning engine 106, on server computer 104 within distributed data processing environment 100 of FIG. 1, in accordance with an embodiment of the present invention. Example 380 includes the same transformed tables shown in example 370, i.e., transformed flights table 342, transformed airports table 344, transformed planes table 346, transformed airlines table 348, and transformed weather table 350. The lines between each of the tables represent some of the joining paths from the main table, transformed flights table 342, to the other tables. The joining path from transformed flights table 342 to transformed airports table 344, transformed airlines table 348, and transformed weather table 350 are each of a depth equals one. The joining path from transformed flights table 342 to transformed planes table 346 is of a depth equals two, because the path flows through transformed airports table 344.

Figure 4:
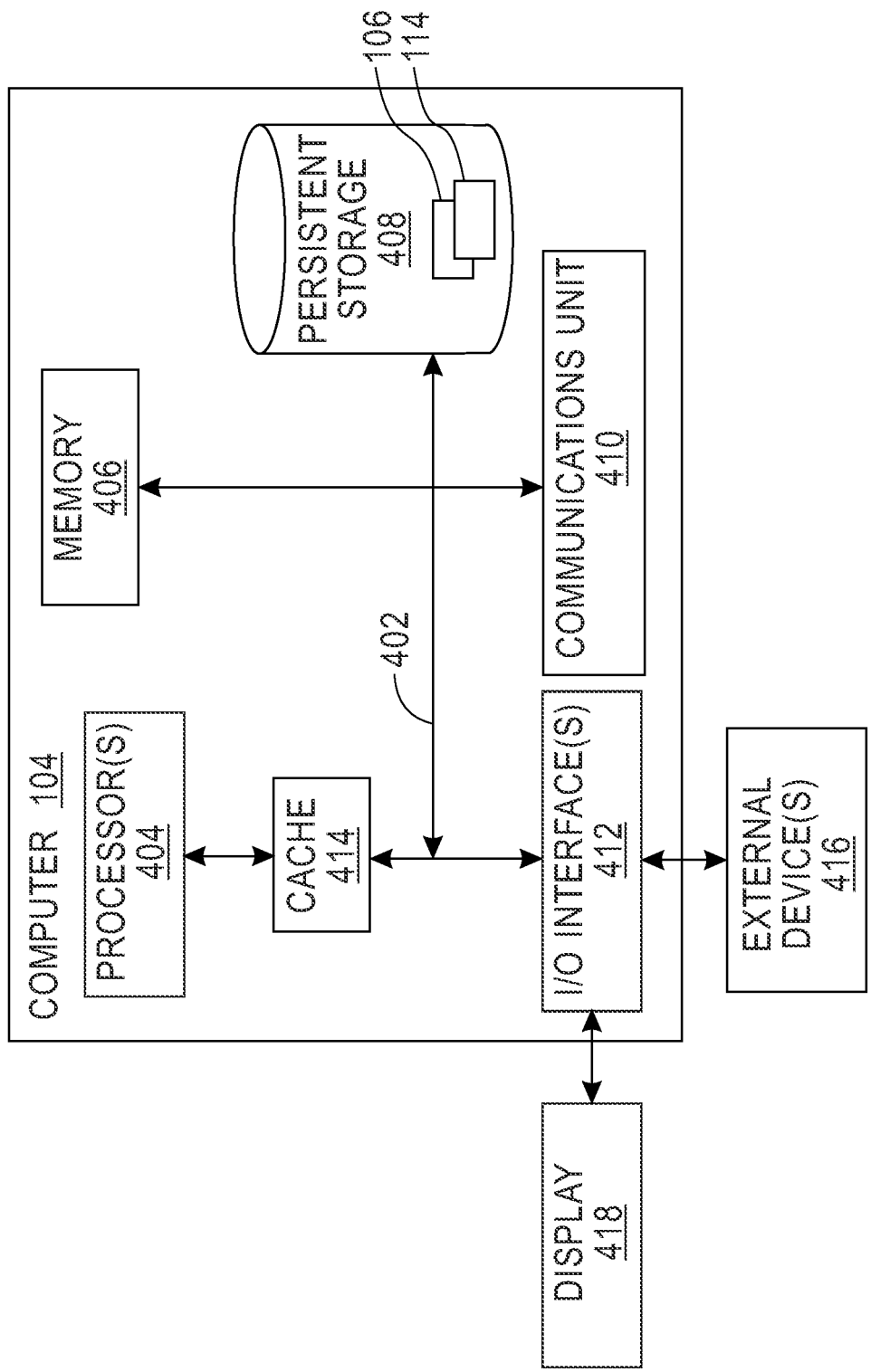
FIG. 4 depicts a block diagram of components of the server computer executing the unsupervised feature learning engine within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., unsupervised feature learning engine 106 and relational database 114, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 118. In these examples, communications unit 410 includes one or more network interface cards. Communications unit 410 may provide communications through the use of either or both physical and wireless communications links. Unsupervised feature learning engine 106, relational database 114, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., unsupervised feature learning engine 106 and relational database 114 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   training, by one or more computer processors, one or more entity aware autoencoders on one or more tables corresponding to an entity in a relational database, wherein each of the one or more entity aware autoencoders corresponds to one of the one or more tables in the relational database, wherein each of the one or more entity aware autoencoders are comprised of an encoder and a decoder, and wherein each of the one or more entity aware autoencoders uses a group of rows of the one or more tables as an input to predict each row in the group;

transforming, by one or more computer processors, each of the one or more tables in the relational database with the encoder of the corresponding trained entity aware autoencoder;

joining, by one or more computer processors, a first transformed table of the one or more tables in the relational database with each remaining one or more transformed tables in the relational database to form one or more joined tables;

aggregating, by one or more computer processors, the one or more joined tables; and outputting, by one or more computer processors, one or more feature representations.

2. The computer-implemented method of claim 1, wherein joining the first transformed table of the one or more tables in the relational database with each remaining one or more transformed tables in the relational database further comprises:

performing, by one or more computer processors, a groupby operation on the one or more joined tables.

3. The computer-implemented method of claim 1, wherein joining the first transformed table of the one or more tables in the relational database with each remaining one or more transformed tables in the relational database further comprises:

receiving, by one or more computer processors, a specified maximum depth for a joining operation; and joining, by one or more computer processors, the first transformed table of the one or more tables in the relational database with each remaining one or more transformed tables in the relational database along one or more joining paths, wherein the one or more joining paths traverse a depth less than or equal to the maximum depth, and wherein the maximum depth is a number of steps between the first transformed table and another transformed table of the one or more tables.

4. The computer-implemented method of claim 1, wherein aggregating the one or more joined tables further comprises:

responsive to determining the one or more joined tables include a timestamp column, using, by one or more computer processors, a most-recent aggregation function.

5. The computer-implemented method of claim 1, wherein aggregating the one or more joined tables further comprises:

responsive to determining the one or more joined tables do not include a timestamp column, using, by one or more computer processors, a mean aggregation function.

6. The computer-implemented method of claim 1, wherein the relational database includes structured data.

7. The computer-implemented method of claim 1, wherein the one or more joined tables are connected by a column of data.

8. A computer program product comprising:

one or more computer readable storage media and program instructions collectively stored on the one or more computer readable storage media, the stored program instructions comprising:

program instructions to train one or more entity aware autoencoders on one or more tables corresponding to an entity in a relational database, wherein each of the one or more entity aware autoencoders corresponds to one of the one or more tables in the relational database, wherein each of the one or more entity aware autoencoders are comprised of an encoder and a decoder, and wherein each of the one or more entity aware autoencoders uses a group of rows of the one or more tables to predict each row in the group;

program instructions to transform each of the one or more tables in the relational database with the encoder of the corresponding trained entity aware autoencoder;

program instructions to join a first transformed table of the one or more tables in the relational database with each remaining one or more transformed tables in the relational database to form one or more joined tables;

program instructions to aggregate the one or more joined tables; and program instructions to output one or more feature representations.

9. The computer program product of claim 8, wherein the program instructions to join the first transformed table of the one or more tables in the relational database with each remaining one or more transformed tables in the relational database comprise:

program instructions to perform a groupby operation on the one or more joined tables.

10. The computer program product of claim 8, wherein the program instructions to join the first transformed table of the one or more tables in the relational database with each remaining one or more transformed tables in the relational database comprise:

program instructions to receive a specified maximum depth for a joining operation; and program instructions to join the first transformed table of the one or more tables in the relational database with each remaining one or more transformed tables in the relational database along one or more joining paths, wherein the one or more joining paths traverse a depth less than or equal to the maximum depth, wherein the one or more joining paths traverse a depth less than or equal to the maximum depth, and wherein the maximum depth is a number of steps between the first transformed table and another transformed table of the one or more tables.

11. The computer program product of claim 8, wherein the program instructions to aggregate the one or more joined tables comprise:

responsive to determining the one or more joined tables include a timestamp column, program instructions to use a most-recent aggregation function.

12. The computer program product of claim 8, wherein the program instructions to aggregate the one or more joined tables comprise:

responsive to determining the one or more joined tables do not include a timestamp column, program instructions to use a mean aggregation function.

13. The computer program product of claim 8, wherein the relational database includes structured data.

14. The computer program product of claim 8, wherein the one or more joined tables are connected by a column of data.

15. A computer system comprising:

one or more computer processors;

one or more computer readable storage media;

program instructions collectively stored on the one or more computer readable storage media for execution by at least one of the one or more computer processors, the stored program instructions comprising:

program instructions to train one or more entity aware autoencoders on one or more tables corresponding to an entity in a relational database, wherein each of the one or more entity aware autoencoders corresponds to one of the one or more tables in the relational database, wherein each of the one or more entity aware autoencoders are comprised of an encoder and a decoder, and wherein each of the one or more entity aware autoencoders uses a group of rows of the one or more tables to predict each row in the group;

program instructions to transform each of the one or more tables in the relational database with the encoder of the corresponding trained entity aware autoencoder;

program instructions to join a first transformed table of the one or more tables in the relational database with each remaining one or more transformed tables in the relational database to form one or more joined tables;

program instructions to aggregate the one or more joined tables; and program instructions to output one or more feature representations.

16. The computer system of claim 15, wherein the program instructions to join the first transformed table of the one or more tables in the relational database with each remaining one or more transformed tables in the relational database comprise:

program instructions to perform a groupby operation on the one or more joined tables.

17. The computer system of claim 15, wherein the program instructions to join the first transformed table of the one or more tables in the relational database with each remaining one or more transformed tables in the relational database comprise:

program instructions to receive a specified maximum depth for a joining operation; and program instructions to join the first transformed table of the one or more tables in the relational database with each remaining one or more transformed tables in the relational database along one or more joining paths, wherein the one or more joining paths traverse a depth less than or equal to the maximum depth, wherein the one or more joining paths traverse a depth less than or equal to the maximum depth, and wherein the maximum depth is a number of steps between the first transformed table and another transformed table of the one or more tables.

18. The computer system of claim 15, wherein the program instructions to aggregate the one or more joined tables comprise:

responsive to determining the one or more joined tables include a timestamp column, program instructions to use a most-recent aggregation function.

19. The computer system of claim 15, wherein the program instructions to aggregate the one or more joined tables comprise:

responsive to determining the one or more joined tables do not include a timestamp column, program instructions to use a mean aggregation function.

20. The computer system of claim 15, wherein the relational database includes structured data.

* * * * *